United States Patent [19]

Hebert, Jr.

[11] Patent Number: 4,533,989
[45] Date of Patent: Aug. 6, 1985

[54] TRANSFORMERLESS POWER INVERTER WITH ONLY ONE TYPE TRANSISTORS

[75] Inventor: John R. Hebert, Jr., Clarksburg, Mass.

[73] Assignee: Sprague Electric Company, North Adams, Mass.

[21] Appl. No.: 129,048

[22] Filed: Mar. 10, 1980

[51] Int. Cl.³ .......................................... H02M 7/537
[52] U.S. Cl. ...................................... 363/132; 363/98
[58] Field of Search ................... 307/254, 262, 456; 363/17, 98, 132

[56] References Cited

U.S. PATENT DOCUMENTS

| | | | |
|---|---|---|---|
| 3,343,037 | 9/1967 | Kutz | 307/254 |
| 3,441,832 | 4/1969 | Leu | 363/132 |
| 3,662,191 | 5/1972 | Aley | 307/456 X |
| 3,759,078 | 5/1971 | Cronin et al. | 363/17 |
| 3,769,525 | 10/1973 | Foss et al. | 307/254 |
| 4,045,689 | 8/1977 | Tietz | 307/254 |

FOREIGN PATENT DOCUMENTS

| | | | |
|---|---|---|---|
| 52-60937 | 5/1977 | Japan | 307/254 |
| 1125015 | 8/1968 | United Kingdom | 363/132 |

Primary Examiner—Peter S. Wong
Assistant Examiner—Judson H. Jones

[57] ABSTRACT

A full transistor bridge power inverter employs a single untapped DC power supply and no transformer, and includes four power bridge NPN transistors and a simple two NPN transistor commutating circuit. The two commutating transistors are driven from a source providing two square wave signals 180° out of phase with each other. This inverter is capable of driving with a square wave voltage, inductive, resistive and capacitive loads.

1 Claim, 6 Drawing Figures

TRANSFORMERLESS POWER INVERTER WITH ONLY ONE TYPE TRANSISTORS

BACKGROUND OF THE INVENTION

This invention relates to a transformerless power inverter to provide from a DC power supply a low impedance source of AC voltage and more particularly to such an inverter that produces a square wave output voltage and uses only NPN transistors or only PNP transistors.

Many inverter circuits have been devised for such purposes as converting DC power to 60 Hz AC power for operating in the field equipment intended to be energized from an electric-utility-supplied power line, or providing an AC power source of a different frequency than 60 Hz. The loads to be driven by inverters are generally either predominantly inductive or predominantly resistive. A capacitor is often included in the inverter to resonate with an intended inductor load to ameliorate the gating and commutating difficulties ensuing from the lagging load currents. The requirements of a gating and commutating means in an inverter depend upon the characteristics of the intended load.

It is an object of the present invention to provide a bridge type inverter with a simple gating/commutating system for producing a square output voltage across any type of load, inductive, resistive or capacitive.

SUMMARY OF THE INVENTION

A transformerless inverter is comprised of four power transistors of one polarity type, i.e. NPN or PNP that are connected to form a full bridge circuit. A single DC power supply is connected to the one bridge node that is the junction of the collectors of an upper two of the power transistors. The DC supply is also connected to the opposite bridge node at which the emitters of the other and lower two power transistors are connected. Two inverter output terminals are connected to the remaining two nodes.

Two gating/commutating circuits each includes a transistor of the above said one polarity type having the collector connected through a resistor to the above said one node and the emitter connected through a resistor to the opposite node. The collector and emitter of each of the commutating transistors are also connected to the bases, respectively, of an upper and a series associated lower power transistor. A square wave signal generating means separately drives the bases of the two commutating transistors with square wave signals that are 180° out of phase, respectively.

Thus there is impressed upon a load that may be connected across the inverter output terminals, a square wave voltage having equal amplitude positive and negative voltage excursions.

For inductive loads a protective diode must be connected in parallel with each power transistor, in a polarity for conducting in the opposite direction to that which is normal for the parallel transistor. For capacitive loads, only such diodes are needed to parallel and protect the two lower-bridge power transistors. In addition, when capacitive loads are used, two other protective diodes are required, each being in series with the emitter of one of the upper power transistors and connecting that emitter to the junction of the associated inverter output terminal and the associated collector of the lower power transistor. When a resistive load is used, none of the above described protective diodes are required.

Thus, the uniquely simple gating/commutating circuits of this invention are capable of use in a full transistor bridge inverter for driving with a square voltage, inductive, resistive and capacitive loads.

DESCRIPTION OF THE PREFERRED EMBODIMENTS

Figure 1:
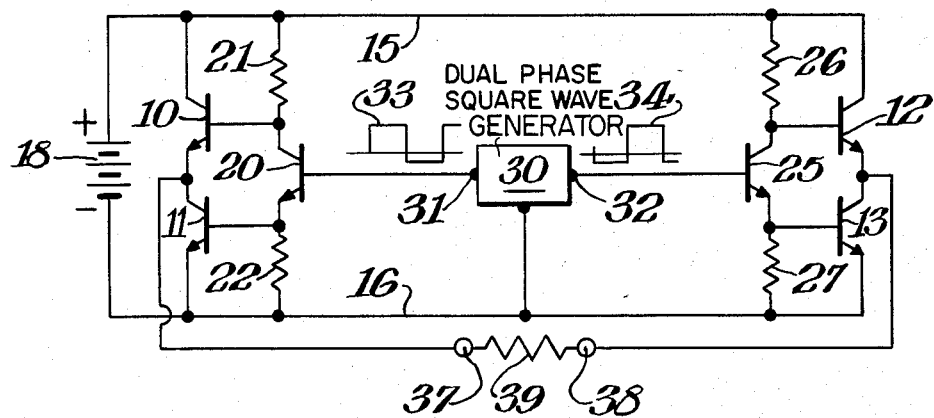
FIG. 1 shows a basic inverter circuit of this invention.

With reference to FIG. 1, four NPN power transistors 10, 11, 12 and 13 are connected to form a bridge. The bridge circuit has four nodes, a first node corresponding to the positive DC power buss 15 and a second node corresponds to the negative power buss 16. A DC power supply 18 is connected to busses 15 and 16. A gating/commutating circuit consisting of an NPN commutating transistor 20, a collector resistor 21 and an emitter resistor 22 is connected between busses 15 and 16. The collector and emitter of transistor 20 are connected to the bases of power transistors 10 and 11, respectively, so that when commutating transistor 20 is off power transistor 10 is held on and power transistor 11 is held off, and vice versa. Another commutating circuit consisting of an NPN commutating transistor 25, collector resistor 26 and emitter resistor 27 has the same relationship to power transistors 12 and 13.

The third and fourth nodes of the bridge circuit correspond to the connections, emitters to collectors, of power transistor pairs 10–11 and 12–13, respectively. A square wave voltage generator, represented by the box 30, has two output terminals 31 and 32, at which square wave voltage signals 33 and 34, respectively, are produced. These signals 33 and 34 are 180° out of phase with each other.

The upward excursions of these voltages must be positive with respect to buss 16 in order that commutating transistors 20 and 25 may be switched fully on, while the downward excursion may be at zero volts or negative with respect to buss 16 in order to switch off the commutating transistors 20 and 25. Many simple circuits are known that produce such out of phase square wave voltages including a variety of free running multivibrators employing as few as two NPN transistors.

The power inverter thus far described has two output terminals 37 and 38 connected to the aforesaid third and fourth bridge nodes, respectively. A resistive load 39 is shown in FIG. 1 connected across the terminals 37 and 38. In operation, the commutation transistors 20 and 25 are alternately turned on. When transistor 20 is on, transistor 25 is off and during this period power transistors 11 and 12 are on, connecting the load 39 directly across the DC power supply 18. In the following period, transistors 11 and 12 turn off and transistor 10 and 13 turn on, connecting the load 39 in the reverse polarity directly across the DC power supply 18. A square wave voltage having equal positive and negative excursions is thus applied to the resistive load 39.

Figure 2:
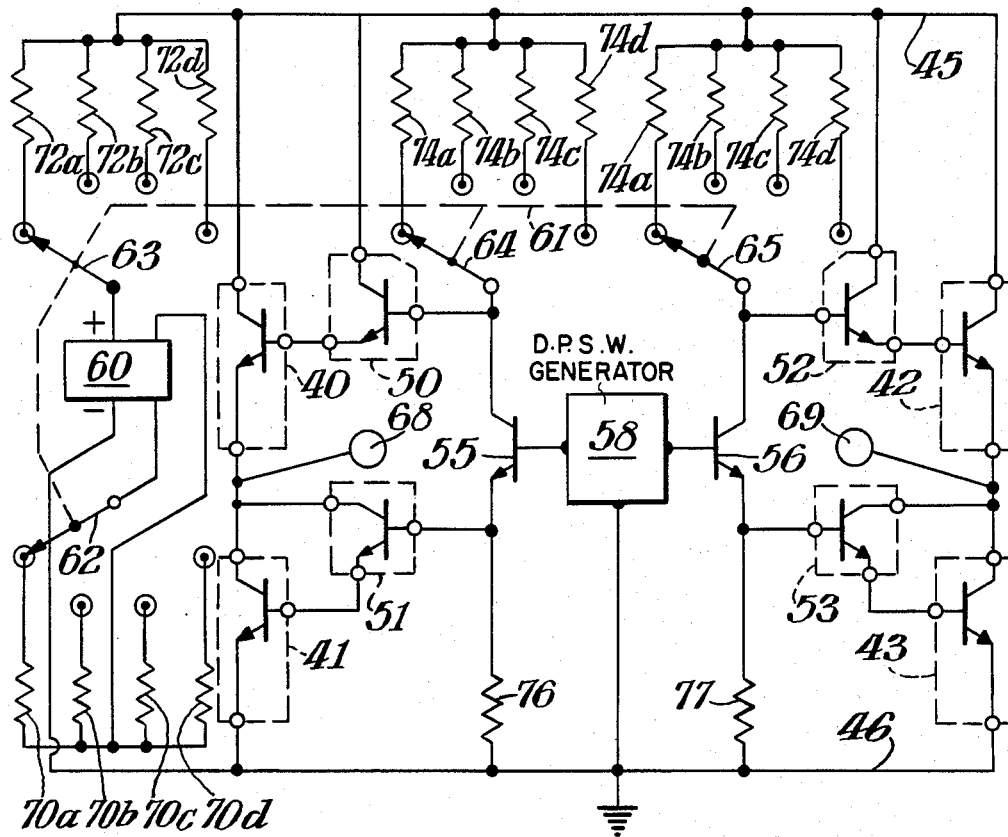
FIG. 2 shows another inverter circuit of this invention.

Employing the basic circuit shown in FIG. 1, a transformerless inverter was built for testing film capacitors in accordance with a standard dielectric withstanding voltage test, namely MIL-STD-202 Method 301 that is required in MIL-C-85421/1. With reference to FIG. 2, four bridge-connected power transistors, 40, 41, 42 and 43 were connected at two opposite nodes to DC power supply busses 45 and 46. Associated with each of the power transistors 40, 41, 42 and 43 are power amplifier transistors 50, 51, 52 and 53, respectively. In principle, each combination of power amplifier and power transistor (e.g. transistors 50 and 40 in FIG. 2) is equivalent to a single power transistor (e.g. transistor 10 in FIG. 1). Commutating transistors 55 and 56 have the same circuit relationship to the power transistors 40, 41, 42 and 43 as the above described commutating transistors 20 and 25 of FIG. 1 have to power transistors 10, 11, 12 and 13. Likewise, a dual phase square wave generator 58 alternately drives the commutating transistors 55 and 56 providing positive excursions of 8 volts and negative excursions of −3 volts relative to ground buss 46 at a rate of 100 Hz.

The programable DC power supply 60 is a Model DCR-600-4.5B supplied by the Sorensen Company, Manchester, N.H., having four 1600 micro farad electrolytic capacitors parallel connected to the output terminals (not shown).

A four position manual switch 61 has four mechanically ganged poles 62, 63, 64 and 65. For each position of the switch, the output voltage at terminals 68 and 69 has a particular peak to peak voltage, namely 90, 300, 600 and 800 volts for the position of the poles as shown and sequential positions to the right, respectively. Resistors 70a, 70b, 70c and 70d having values 900, 3K, 6K and 8K ohms, respectively, determine the output voltage of the DC supply 60. Resistors 72a, 72b, 72c and 72d having values 1, 3, 6 and 8 ohms, respectively, limit the load current through terminals 68 and 69. Resistors 74a, 74b, 74c and 74d having values 600, 5K, 8K and 15K, respectively make adjustment in the biasing level at the bases of amplifier transistors 50 through 53 appropriate to the voltage appearing across busses 45 and 46. Each of the commutation circuit emitter resistors 76 and 77 are 510 ohms.

Figure 3:
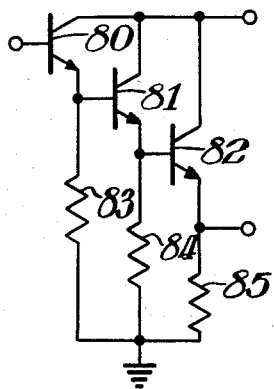
FIG. 3 shows a group of darlington connected transistors that may be substituted for each of the amplifier transistors 51 and 53 in FIG. 2.
Figure 4:
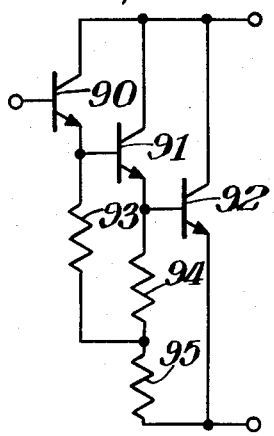
FIG. 4 shows a group of darlington connected transistors that may be substituted for each of the amplifier transistors 50 and 52 in FIG. 2.
Figure 5:
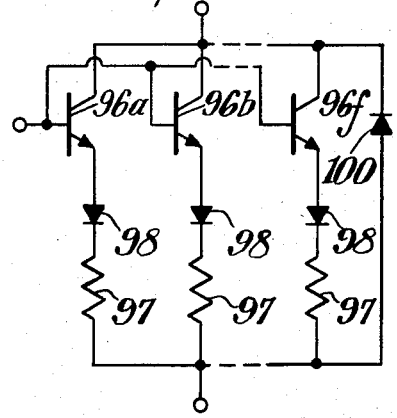
FIG. 5 shows a group of parallel transistors and associated protective diodes and current equalizing resistors which circuit may be substituted for each of the bridge transistors 40, 41, 42 and 43 in FIG. 2.

Each of the single amplifier transistors 51 and 53 of FIG. 2 is actually made up of the darlington group of three transistors 80, 81 and 82 of FIG. 3. Emitter resistors 83, 84 and 85 that go to ground are not indicated in the simplified circuit of FIG. 2. Likewise each of the amplifiers 50 and 52 consists of the darlington circuit shown in FIG. 4 having transistors 90, 91 and 92 and emitter resistors 93, 94 and 95. Also, each of the power transistors 40, 41, 42 and 43 in FIG. 2 is composed of six transistors connected in parallel as shown in FIG. 5. Only three of these transistors 96a, 96b and 96f are shown. The values of resistors 83, 84 and 85 are 4K ohms and those of resistors 93, 94 and 95 are 10K ohms. Each of these transistors 96a–96f is connected in series with a 0.5 ohm resistor 97 and a diode 98 having a high reverse voltage capability. These diodes 98 must be included in the equivalent power transistors 40 and 42 of FIG. 2 when the load across terminals 68 and 69 is predominantly capacitive, e.g., in order to prevent breakdown of the base emitter junctions in transistors 96 that are substituted for transistor 40, at the time power transistor 41 is turning on and power transistor 40 is turning off.

The diode 100 that parallels each group of six power transistors 96a–96f in FIG. 5 is not necessary at all when the load is substantially resistive. However, for capacitive loads, a diode 100 is needed in each of the two power transistors 41 and 43, e.g. to speed up the discharge of the capacitor when transistor 40 is turning off and transistor 41 is turning on, but more importantly to prevent high and damaging currents collector to base in transistors 43 and 53 and further through the emitter-base junction of commutating transistor 56.

All transistors employed in the capacitor test equipment illustrated in FIGS. 2, 3, 4 and 5 are supplied by Texas Instrument, Inc., Dallas, Tex., part designation TIP 553. With the manual switch rotated fully clockwise, this equipment produced a square wave voltage across a 2.2 microfarad capacitor providing a peak to peak amplitude of 800 volts, supporting peak currents of 50 amperes, and with a voltage rise time of a little over 100 microseconds.

A diode 100 is essential in each of the four power transistors 40, 41, 42 and 43 when there is an inductive load across terminals 68–69, to provide a momentary reverse path for the lagging inductive current, e.g., around transistors 41 and 42 at the time these transistors are being driven on, to prevent eventual damage to all of the transistors 40, 41, 42, 43, 50, 51, 52, 53, 55 and 56. It is known to use such diodes across the four controlled-rectifiers (four layer devices) in an AC bridge circuit for control of inductive motor loads. In the present all NPN bridge with a capacitor load, a diode 100 is required across a lower transistor, e.g. 41 or 43, when it is turning off, (not when it is turning on as in the controlled-rectifier counterpart mentioned above), to prevent forward biasing of the collector to base junction and to speed the discharge of the capacitor load. Furthermore, for driving a capacitive load, diodes 100 are not needed across the upper transistors, e.g. 40 and 42, unlike in the controlled rectifier bridge counterpart for driving an inductive load.

The simple gating/commutating circuit provides all necessary biasing and base-signal sources to the four bridge power transistors, 40–43 while requiring itself only low positive to zero complimentary input voltages relative to one of the DC power busses 46.

Figure 6:
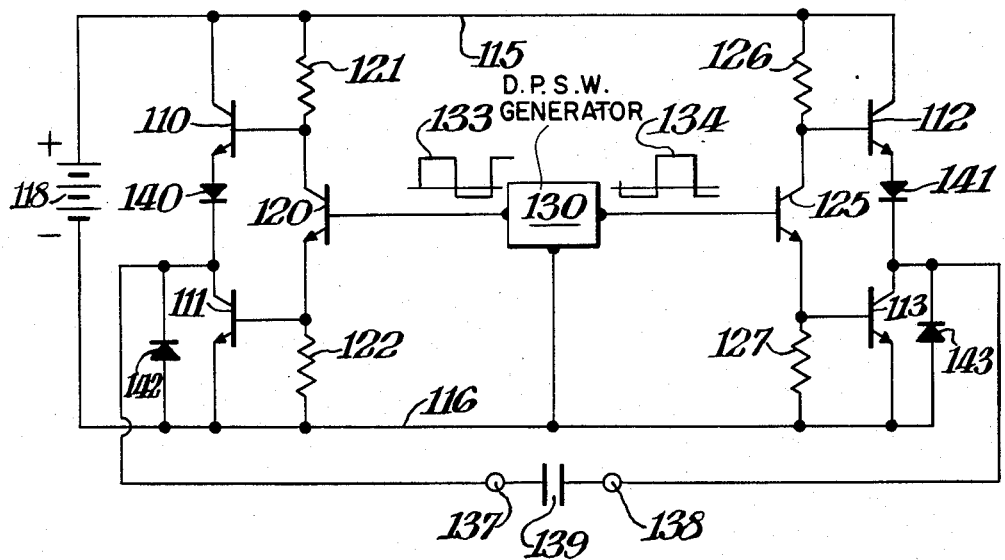
FIG. 6 shows an inverter circuit of this invention having all necessary protective diodes for driving a capacitive load.

In accordance with the foregoing, a basic inverter circuit of this invention having all necessary protective diodes for driving a capacitive load is shown in FIG. 6. The numerical designations for the components in the circuit of FIG. 6 that correspond to those in FIG. 1 are derived by adding 100 to the latter. The protective series diodes 140 and 141 have the functions attributed to diodes 98 (FIG. 5) that are incorporated in the transistors 40 and 42 of FIG. 2 when a capacitive load 139 is used. Likewise, the protective diodes 142 and 143 that parallel transistors 111 and 113 in FIG. 6, have the same functions attributed to diodes 100 (FIG. 5) that are incorporated in transistors 41 and 43 of FIG. 2 when a capacitive load 139 is used.

What is claimed is:

1. A transformerless inverter comprising: (a) four NPN power transistors connected to form a bridge circuit having four circuit nodes; (b) one DC power buss being connected to a first of said nodes; (c) another DC power buss being connected to a second of said nodes that is opposite said first node, a first and second of said bridge-connected transistors being series connected respectively emitter to collector at the fourth of said nodes that is opposite said third node, the collectors of said first and third bridge-connected transistors being connected to said first node; (d) two commutating circuits each comprising an NPN commutating transistor, a collector resistor connected between the collector of said commutating transistor and said first node, and an emitter resistor being connected between the emitter of said commutating transistor and said second node, the collector and emitter of one of said commutating transistors being connected to the bases of said first and second bridge-connected transistors, respectively, the collector and emitter of the other of said commutating transistors being connected to the bases of said third and fourth bridge-connected transistors, respectively; (e) a square wave generating means for producing two periodic square wave signals at the bases of said two commutating transistors, respectively, which signals are 180° out of phase with each other and which signals periodically turn on and turn off said commutating transistors; (f) a first pair of diodes each being connected anode to cathode in parallel respectively with one of said second and fourth bridge-connected transistors emitter to collector; (g) each of a second pair of diodes having an anode connected to an emitter of one of said first and third bridge-connected transistors, said second pair diodes forming the connection between said first and third transistors and said third and fourth nodes, respectively; (h) a pair of load terminals that are connected to said third and fourth nodes, respectively; and (i) a capacitive load connected across said load terminals so that there is impressed upon said capacitive load a square wave voltage having equal amplitude positive and negative excursions.

* * * * *